US000001190H

United States Statutory Invention Registration [19]

[11] Reg. Number: H1190

Cramer

[43] Published: Jun. 1, 1993

[54] ANALYTICAL SAMPLING VALVE

[76] Inventor: Gregory D. Cramer, 201 N. Porter St., Seaford, Del. 19973

[21] Appl. No.: 718,943

[22] Filed: Jun. 21, 1991

[51] Int. Cl.[5] ..... G01N 1/20

[52] U.S. Cl. ..... 73/863.61; 73/863.86; 73/864.56; 251/328

[58] Field of Search ..... 73/863.61, 863.86, 863.72, 73/863.73, 864.83, 864.84, 863.57, 863.58, 863.41, 864, 864.56; 251/326, 328, 333; 137/599.1, 872

[56] References Cited

U.S. PATENT DOCUMENTS

| | | | |
|---|---|---|---|
| 2,481,882 | 9/1949 | Sebald et al. | 73/863.61 X |
| 3,918,678 | 11/1975 | Rechtsteiner et al. | 251/214 X |
| 4,018,089 | 4/1977 | Dzula et al. | 73/863.61 X |
| 4,037,475 | 7/1977 | Topham | 73/864 X |
| 4,215,565 | 8/1980 | Zanker | 73/863.61 X |
| 4,281,935 | 8/1981 | Cramer et al. | 366/174 |
| 4,307,620 | 12/1981 | Jiskoot | 73/863.61 X |
| 4,458,543 | 7/1984 | Mieth | 73/863.86 |
| 4,474,889 | 10/1984 | Terry et al. | 73/23.42 X |
| 4,727,758 | 3/1988 | Murdock | 73/863.61 |
| 4,890,502 | 1/1990 | Elias et al. | 73/864.85 |

FOREIGN PATENT DOCUMENTS

| | | | |
|---|---|---|---|
| 363890 | 12/1972 | U.S.S.R. | 73/863.86 |
| 783628 | 11/1980 | U.S.S.R. | 73/863.86 |

*Primary Examiner*—Stephen M. Johnson

[57] ABSTRACT

An analytical sampling valve that permits pumping of a side stream of fluid from a main process fluid stream through a monitoring device to measure fluid stream properties, and return of the sample to the main process line downstream of the sampling position, while providing the ability to clean the lines or remove the monitoring or pumping apparatus without shutdown of fluid flow.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ANALYTICAL SAMPLING VALVE

BACKGROUND OF THE INVENTION

This invention relates to a valve and, more particularly, to a valve for sampling a fluid flowing in stream for analysis and returning the sampled fluid to the stream.

Dzula, Levine and Sperry in their U.S. Pat. No. 4,018,089 disclose an apparatus for diverting a portion of a process fluid stream to contact a sensor device. Valves are provided away from the main process fluid stream to isolate the sensor from the fluid stream for removal of the sensor without shutdown of the fluid stream. However, fluid flow in the main process stream must be stopped in order to clean the ports which extend into the main process conduit while causing a stagnant area between the main fluid stream and the shutoff valves when the valves are closes.

Murdock, U.S. Pat. No. 4,727,758, discloses a flow-through sampling device for filtering a portion of a fluid side stream which provides a means for removal and cleaning of the sample chamber without shutdown of the main fluid flow. However, the pump cannot be removed for servicing without shutdown of the process stream.

Jiskott, U.S. Pat. No. 4,307,620, discloses a device for obtaining a homogeneous sample from a fluid stream by removing liquid from a main pipeline and returning it through a return loop upstream of the inlet to the return loop through mixing jets to agitate the fluid to obtain a substantially uniform mixture. In the event that plugging of the return loop lines occurs, it is necessary to stop fluid flow in the main pipeline.

SUMMARY OF THE INVENTION

The present invention provides an apparatus for pumping a side stream of a main process fluid flowstream through a return loop which contains an analytical device for on-line measurement of the fluid stream properties. The apparatus includes a valve which permits all parts of the return loop conduits, analytical device, and pump to be isolated from the main process conduit for cleaning, replacement, etc. without the need for process shutdown. The valve has a body with a flow path extending from an inlet to an outlet end through which the fluid flow stream passes. A valve stem is connected to the body and it is movable through the flow path to engage a valve seat located in the body directly opposite the valve stem, the valve seat has a surface exposed to said flow path, and the seat has an inlet passage and an outlet passage therethrough extending from the surface. Means are connected between the inlet passage and said outlet passage for analyzing properties of said fluid stream along with means for withdrawing a sample of the stream through said inlet passage, passing the sample to the means for analyzing properties and returning the sample back to the stream through the outlet passage. The valve may be used in conjunction with any of a number of analytical devices including devices for infrared analysis and measurement of viscosity, concentration, and other physical or chemical properties of the fluid stream.

DETAILED DESCRIPTION OF THE ILLUSTRATED EMBODIMENTS

Figure 1:
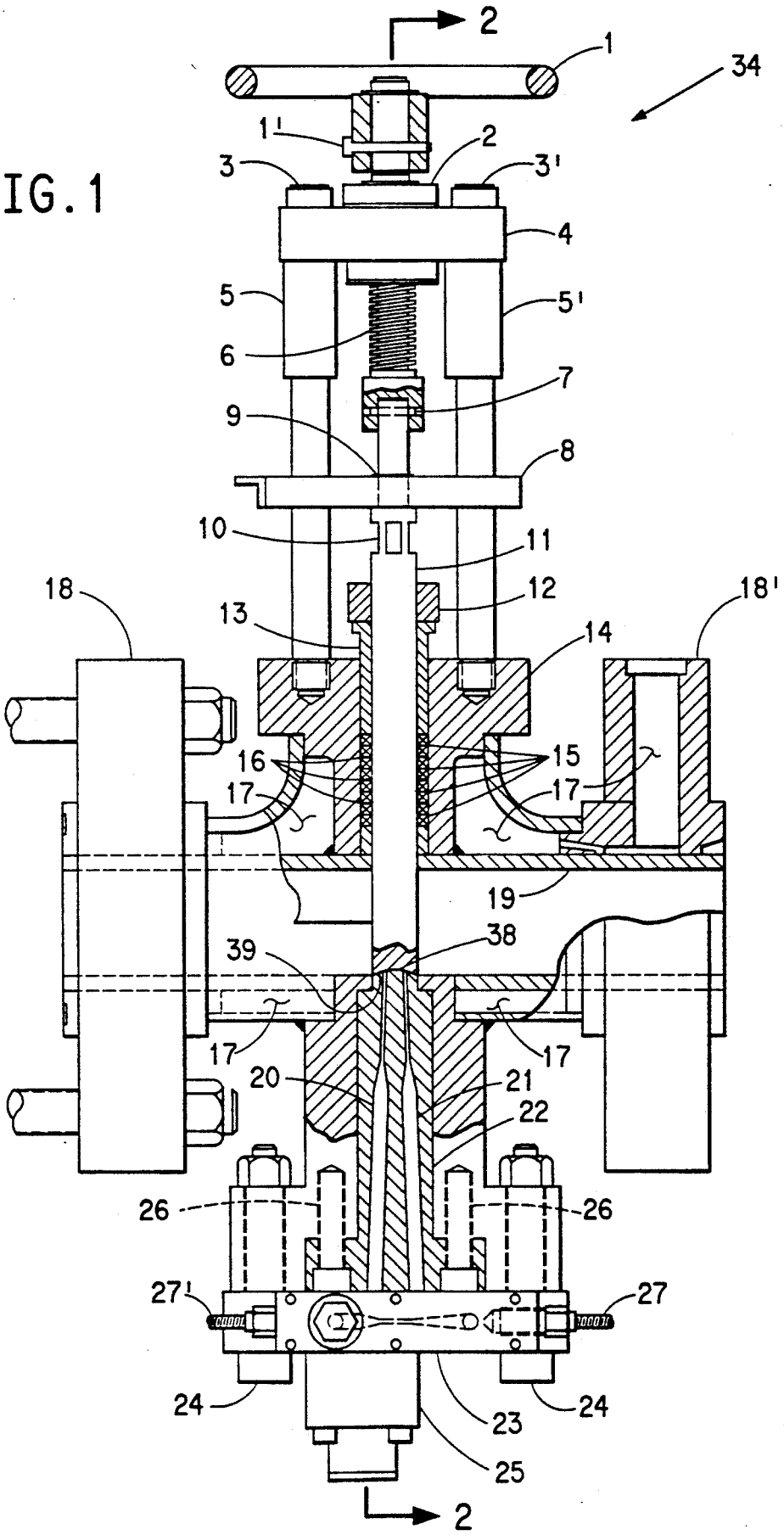
FIG. 1 is a cross-sectioned side elevation view of a preferred embodiment of the valve of the current invention used in conjunction with a melt viscometer.
Figure 2:
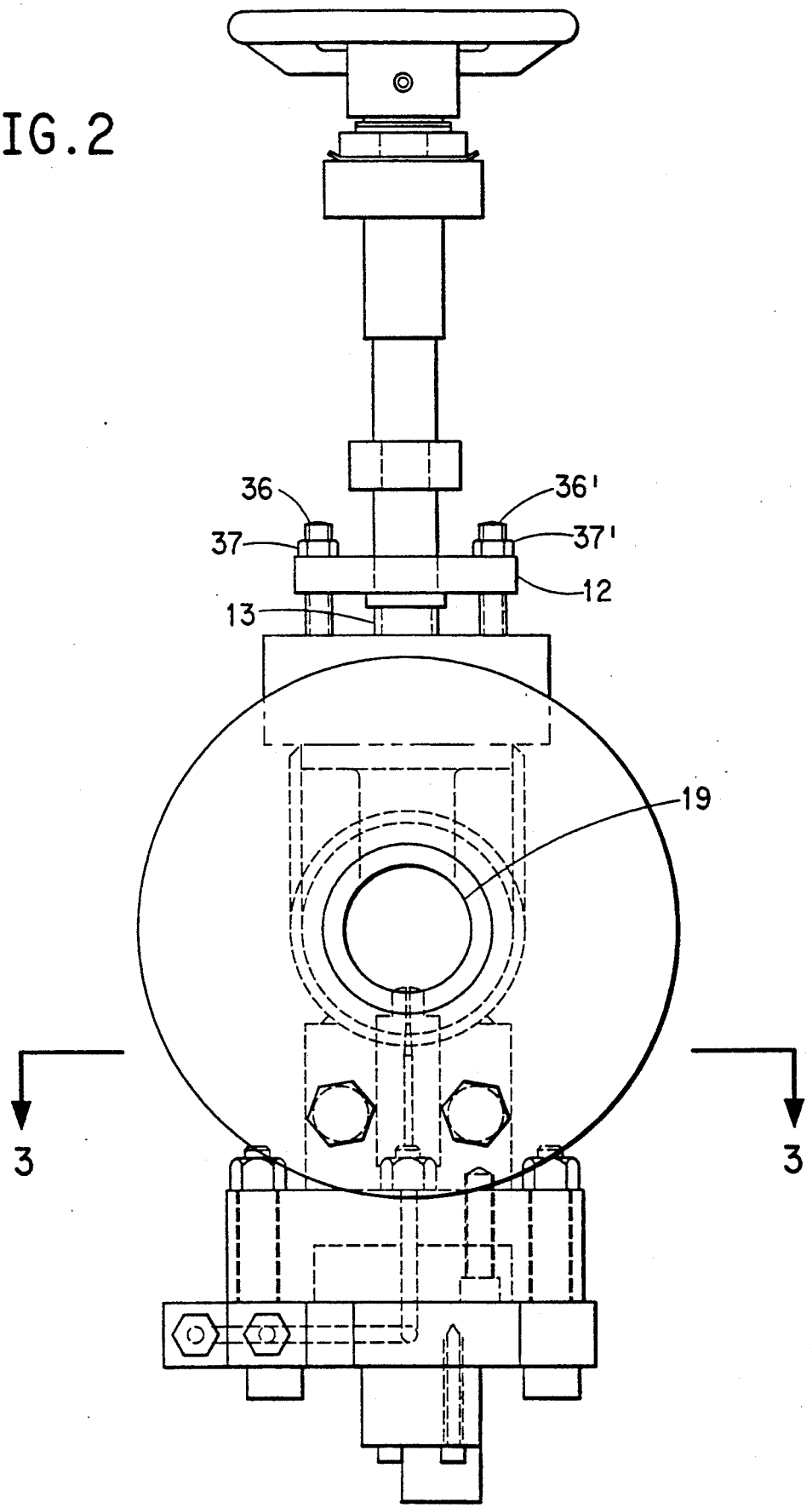
FIG. 2 is a cross-sectioned elevation view of FIG. 1 along line 2—2.
Figure 3:
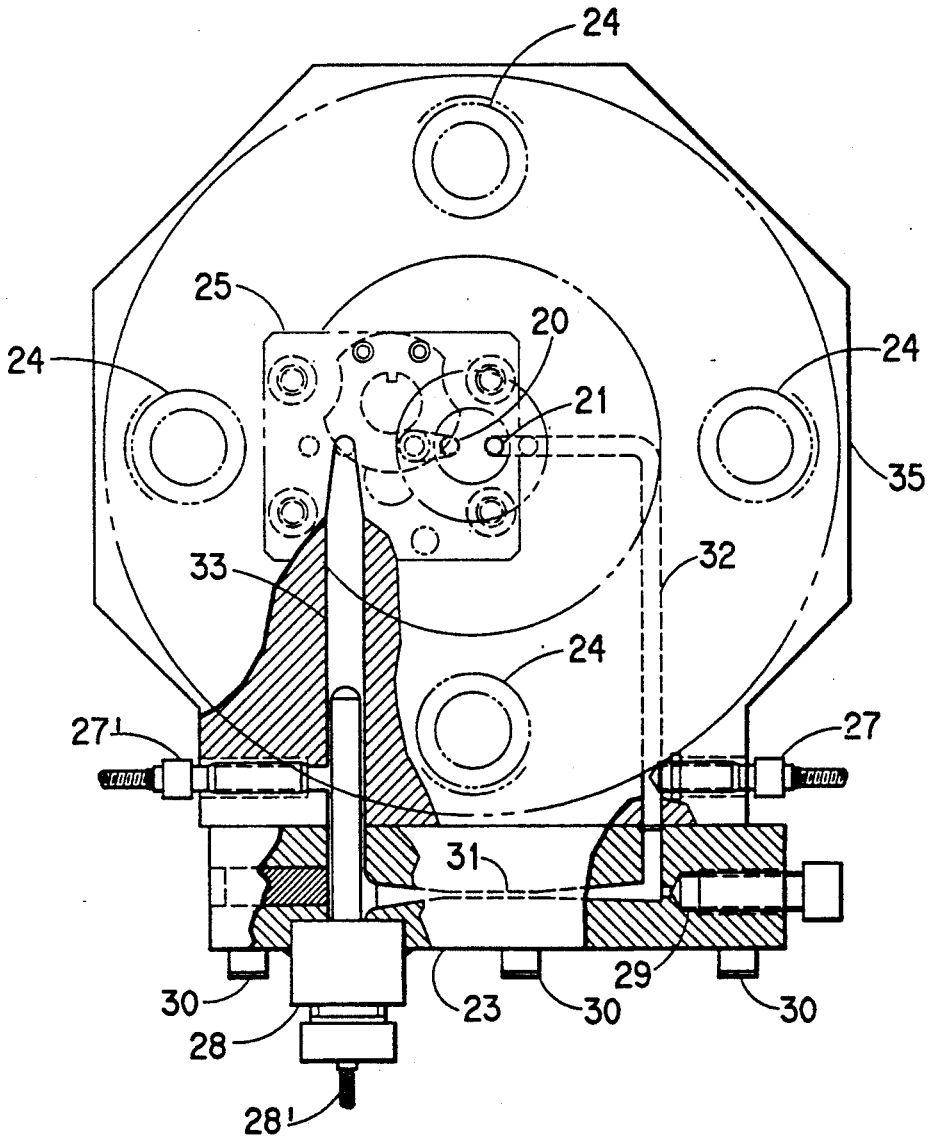
FIG. 3 is a section view of FIG. 2 along line 3—3.

The embodiment chosen for purposes of illustration of the current invention is shown in FIGS. 1–3. Valve body 14 has a fluid flow path 19 therethrough from an inlet end flange 18 to an outlet end flange 18' for connection to subsequent outlet piping. A valve control mechanism 34 comprises a valve stem 11 which may be actuated by a handwheel 1 connected to one end of the valve stem. Handwheel 1 is connected to screw 6 by use of pin 1'. The valve stem extends from handwheel 1 through a yoke 4 supported by posts 5, 5'. The yoke is held tightly to posts 5, 5' by bolts 3, 3' threaded into valve body 14. The yoke includes a threaded bushing 2 through which stem 11 advances as it is rotated.

The end of valve stem 11 opposite handwheel 1 extends through packing gland 13 to the fluid flow path 19 in valve body 14. Stem 11 is joined to screw 6 by pin 7. Pin 7 rotates inside of the stepped and hollowed end of screw 6 which serves to clamp the stem 11 and screw 6 together such that they may rotate independently but are constrained to advance together. A safety bar 8 to restrict the removal of stem 11 is loosely held in place on stem 11 by a clip 9. The safety bar 8 and the attached stem 11 cannot be removed outwardly beyond the steps in posts 5, 5' in the event that yoke 4 is inadvertently removed.

The valve is shut off by advancing stem 11 using valve control mechanism 34 until stem surface 8 is in intimate contact with seat surface 39. FIG. 1 shows the valve in the closed position.

The above description is provided by way of example only. The stem sealing surface 38 and seat surface 39 may be redesigned depending on the requirements of fluid or used to provide a leaktight fit. A variety of seat/stem complementary mating configurations, such as tapered, rounded, flat, convex/concave, and concave/convex are possible.

If desired for cleaning purposes and/or shutoff operations, the stem 11 may be rotated respective to and in contact with the seat surface 39 of passageway insert 22. This may be accomplished by turning stem 11 with a wrench engaging the flats 10 on the stem piece. An alternate embodiment is to provide stem 11 directly connected to screw 6 such that stem 11 is not independently rotatable with relation to handwheel 1.

Valve body 14 may be provided with jacket means 17 for circulation of heat transfer fluid if required to maintain the fluid in fluid flow path 19 in a molten or heated state, as in a molten polymer stream.

The fluid in fluid flow path 19 is prevented from leaking past stem 11 by packing rings 15 separated by metal wafers 16 both held in tight arrangement by packing follower 13 which is held in place and adjusted by the placement of plate 12. Plate 12 is adjusted by the position of nuts 37, 37' on studs 36, 36', as shown in FIG. 2.

The embodiment shown in FIGS. 1–3 is a viscometer assembly intended to predict the viscosity of a constant volume of fluid passing through a small capillary using the relationship of pressure drop, fluid temperature and flow rate. In a similar manner a wide variety of analytical property measuring instrument systems using such methods as light, ultrasonic, sonic, electromagnetic radiation, IR, and color as well as various injection systems may be fabricated and fastened to body 14.

In operation, the fluid to be sampled is drawn from the fluid flow path 19 past a hole in seat surface 39 and into inlet passageway 20 that is formed in passageway insert 22. Passageway insert 22 with integral sealing seat surface 39 is held tightly in body 14 by bolts 26. The fluid from inlet passageway 20 then enters the pump 25, which would usually be of but not restricted to the gear type, which provides volumetric metering and pressure generation. Pump 25 will normally be driven by a motor, gearbox, and interconnecting shafts, not shown. Upon exiting pump 25 the fluid enters capillary inlet passageway 33 where the pressure is sensed with pressure bulb 27' and the temperature is sensed with thermocouple 28' or alternately a resistance temperature device that is inserted in thermowell 28 being in direct contact with the fluid in capillary inlet passageway 33. The fluid is then forced through capillary 31 and into capillary outlet passageway 32. Alternatively, the thermocouple 28' and thermowell 28 assembly may be positioned downstream of capillary 31 in capillary outlet passageway 32. A removable plug 29 may be provided to allow access for capillary cleaning. The capillary outlet pressure is sensed by pressure bulb 27. The fluid is then returned to the passageway insert by way of capillary outlet passageway 32. The pump block 35 is fastened to body 14 by means of bolts 24. The capillary may be removed for cleaning or replacement by removing capillary body 23 by means of bolts 30. The fluid flows back into the fluid flow path 19 by way of outlet passageway 21 in passageway insert 22 and through a downstream hole in seat surface 39. The hole in surface 39 providing fluid for immediate sampling should be upstream of the outlet hole from the sampling device to assure a constant supply of unsampled fluid. It may be necessary to provide fluid mixing in fluid flow path 19 upstream of seat 39 to assure a homogeneous sample of the fluid.

What is claimed is:

1. An apparatus for sampling fluid flowing in a stream, analyzing the properties of said fluid, and returning the sampled fluid to said stream, said apparatus comprising: a valve having a body with a flow path therethrough from an inlet to an outlet end through which said stream passes; a valve stem connected to the body and movable through the flow path to engage a valve seat located in said body directly opposite the valve stem, said valve seat having a surface exposed to said flow path, said seat having an inlet passage and an outlet passage therethrough extending from said surface; means connected between said inlet passage and said outlet passage for analyzing properties of said fluid stream; and means for withdrawing a sample of said stream through said inlet passage; passing said sample to said means for analyzing properties and returning said sample back to said stream through said outlet passage.

2. The apparatus as defined in claim 1 wherein said inlet passage is upstream of said outlet passage.

* * * * *